US012335548B2

(12) United States Patent
Docherty et al.

(10) Patent No.: US 12,335,548 B2
(45) Date of Patent: Jun. 17, 2025

(54) SYSTEM AND METHODS FOR PERFORMING CONTENT RECOMMENDATION PROCEDURES

(71) Applicant: ThinkAnalytics Ltd., Glasgow (GB)

(72) Inventors: Peter Docherty, Glasgow (GB); Christopher McGuire, Glasgow (GB); Alan Ryman, Glasgow (GB); Bryan Bossard, Canyon Country, CA (US); Asim Ullah, Glasgow (GB); Ewen Cattanach, Glasgow (GB)

(73) Assignee: ThinkAnalytics Ltd., Lanarkshire (GB)

( * ) Notice: Subject to any disclaimer, the term of this patent is extended or adjusted under 35 U.S.C. 154(b) by 3 days.

(21) Appl. No.: 18/130,897

(22) Filed: Apr. 4, 2023

(65) Prior Publication Data

US 2024/0340479 A1 Oct. 10, 2024

(51) Int. Cl.
*H04N 21/25* (2011.01)
*H04N 21/231* (2011.01)
(Continued)

(52) U.S. Cl.
CPC ..... *H04N 21/251* (2013.01); *H04N 21/23106* (2013.01); *H04N 21/4147* (2013.01); *H04N 21/4668* (2013.01)

(58) Field of Classification Search
None
See application file for complete search history.

(56) References Cited

U.S. PATENT DOCUMENTS

| | | | |
|---|---|---|---|
| 6,567,814 | B1 | 5/2003 | Bankier et al. |
| 7,805,129 | B1 | 9/2010 | Issa et al. |

(Continued)

FOREIGN PATENT DOCUMENTS

| | | |
|---|---|---|
| EP | 1 317 143 | 6/2003 |
| EP | 2 207 348 | 7/2010 |

(Continued)

*Primary Examiner* — James R Marandi
(74) *Attorney, Agent, or Firm* — Foley & Lardner LLP

(57) ABSTRACT

A computer-implemented method for providing content recommendations for a user of a content distribution system, the method comprising:

opening a content recommendation session for a selected user, wherein a plurality of data processing procedures, or operations, are available for use during the content recommendation session, the plurality of data processing procedures comprising at least one type of content recommendation procedure for generating one or more content recommendation candidates based on user data and/or content metadata and/or other content information; wherein the method further comprises performing a combining process using one or more of the plurality of procedures to generate one or more content recommendation candidates, wherein the combining process comprises at least: receiving at least one content recommendation request for the selected user; processing said at least one request using at least a first procedure selected from the plurality of procedures to generate at least one or more content recommendation candidates; providing at least some of the one or more content recommendation candidates to at least a second procedure selected from the plurality of procedures to generate at least one or more further content candidates.

19 Claims, 8 Drawing Sheets

(51) Int. Cl.
*H04N 21/4147* (2011.01)
*H04N 21/466* (2011.01)

(56) References Cited

U.S. PATENT DOCUMENTS

| | | | |
|---|---|---|---|
| 9,699,491 | B1 | 7/2017 | Docherty et al. |
| 9,756,390 | B1 | 9/2017 | Docherty et al. |
| 9,906,837 | B1 | 2/2018 | Docherty et al. |
| 9,973,797 | B1 | 5/2018 | Docherty et al. |
| 10,091,555 | B1 | 10/2018 | Docherty et al. |
| 10,289,739 | B1 | 5/2019 | Docherty et al. |
| 10,356,035 | B1 | 7/2019 | Gravino et al. |
| 10,412,454 | B2 | 9/2019 | Docherty et al. |
| 11,004,135 | B1 | 5/2021 | Sandler et al. |
| 11,212,584 | B2 | 12/2021 | Docherty et al. |
| 11,343,573 | B2 | 5/2022 | Docherty et al. |
| 2003/0106064 | A1 | 6/2003 | Plourde |
| 2007/0157222 | A1 | 7/2007 | Cordray et al. |
| 2008/0304812 | A1 | 12/2008 | Jin |
| 2009/0271826 | A1 | 10/2009 | Lee et al. |
| 2010/0005492 | A1 | 1/2010 | Takano et al. |
| 2010/0070507 | A1 | 3/2010 | Mori |
| 2011/0243529 | A1 | 10/2011 | Oryoji et al. |
| 2013/0086082 | A1 | 4/2013 | Park et al. |
| 2014/0149344 | A1 | 5/2014 | Pudipeddi et al. |
| 2014/0279756 | A1 | 9/2014 | Whitman |
| 2015/0082330 | A1 | 3/2015 | Yun et al. |
| 2015/0100987 | A1 | 4/2015 | Whitman et al. |
| 2015/0269488 | A1 | 9/2015 | Galai et al. |
| 2016/0147767 | A1 | 5/2016 | Manning et al. |
| 2016/0196580 | A1 | 7/2016 | Hong et al. |
| 2017/0311015 | A1 | 10/2017 | Docherty et al. |
| 2019/0364338 | A1 | 11/2019 | Docherty et al. |
| 2020/0193552 | A1 | 6/2020 | Turkelson et al. |
| 2020/0252690 | A1 | 8/2020 | Docherty et al. |
| 2020/0409983 | A1* | 12/2020 | Miller .............. H04N 21/44204 |
| 2021/0406736 | A1* | 12/2021 | Sennik .................. G06Q 50/22 |
| 2023/0162033 | A1 | 5/2023 | Kadam |
| 2023/0418872 | A1 | 12/2023 | Lamere et al. |
| 2024/0242106 | A1 | 7/2024 | Shamir et al. |

FOREIGN PATENT DOCUMENTS

| | | |
|---|---|---|
| GB | 2 574 581 | 12/2019 |
| WO | WO-01/15449 | 3/2001 |
| WO | WO-02/27526 | 4/2002 |
| WO | WO-2008/042242 | 4/2008 |
| WO | WO-2013/186061 | 12/2013 |
| WO | WO-2021/3130834 | 7/2021 |

* cited by examiner

Table 1 – CRE learning tables

| Section Number | DB Table name |
|---|---|
| Subscriber Timeslot Learning tables | |
| 10.1 | re_sub_ts_learned_language |
| 10.4 | re_sub_ts_content_item_ratings |
| 10.5 | re_sub_ts_feature_ratings |
| 10.6 | re_sub_ts_watched_episodes |
| | |
| Customer Learning tables: | |
| 7.1 | re_customer_learned_language |
| 7.4 | re_content_item_ratings |
| 7.5 | re_feature_ratings |
| 7.6 | re_customer_watched_episodes |
| | |
| Session Learning tables | |
| 12.1 | re_session_learned_language |
| 12.4 | re_session_content_item_ratings |
| 12.5 | re_session_feature_ratings |
| 12.6 | re_session_watched_episodes |
| | |
| Cookie Learning tables | |
| 14.1 | re_cookie_learned_language |
| 14.4 | re_cookie_content_item_ratings |
| 14.5 | re_cookie_feature_ratings |
| 14.6 | re_cookie_watched_episodes |
| | |
| Subscriber Combined Learning tables | |
| 9.1 | re_sub_learned_language |
| 9.4 | re_sub_content_item_ratings |
| 9.5 | re_sub_feature_ratings |
| 9.6 | re_sub_watched_episodes |

Fig. 2

SYSTEM AND METHODS FOR PERFORMING CONTENT RECOMMENDATION PROCEDURES

FIELD

The present disclosure relates generally to a content recommendation system and method, in particular to a method of and system for performing a combining process using one or more content recommendation procedures and/or operations.

BACKGROUND

Developments in technology mean that users are able to access content via a wide array of different mechanisms, and via a wide array of different sources. For example, television channels, radio stations, video-on-demand and other streaming services, social media and other internet content sources provide a vast array of content available to a user. In some systems, it may be required to apply additional constraints on any recommendations, for example, constraints relating to commercial, business and/or legal factors.

When addressing the problem of providing content recommendations, a number of technical challenges and considerations must be addressed. For example, the time constraints demanded by particular content providers, or expected by users, may be particularly demanding and in some cases prohibitive for providing the types of searches and results that are desired. This can present a significant technical challenge, particularly as the system is usually hosted on one or more servers remote from the set top box or other device and, for systems with millions of subscribers, may have to deal simultaneously with hundreds of thousands of user actions or interactions per minute during busy periods.

Known content recommendation systems offer recommendations to a plurality of different users of the system. New recommendation procedures and use cases may be developed over time. To deliver such new functionality to users, system updates are typically required. For example, core updates may be needed to parts of the recommendation system, for example, each user device to provide new types of procedures which may be undesirable.

SUMMARY

In accordance with a first aspect, there is provided a computer-implemented method for providing content recommendations for a user of a content distribution system, the method comprising: opening a content recommendation session for a selected user, wherein a plurality of data processing procedures, or operations, are available for use during the content recommendation session, the plurality of data processing procedures comprising at least one type of content recommendation procedure for generating one or more content recommendation candidates based on user data and/or content information; wherein the method further comprises performing a combining process using one or more of the plurality of procedures to generate one or more content recommendation candidates, wherein the combining process comprises at least: receiving at least one content recommendation request for the selected user; processing said at least one request using at least a first procedure selected from the plurality of procedures to generate at least one or more content recommendation candidates; providing at least some of the one or more content recommendation candidates to at least a second procedure selected from the plurality of procedures to generate at least one or more further content candidates.

The one or more content recommendation candidates may form a first set of content recommendation candidates. The one or more content recommendation candidates may form a second set of content recommendation candidates.

The data processing procedures may comprise procedures, routines, subroutines, programs, and subprogram. Each procedure may be available for access during the content recommendation session via an application programming interface (API). The combining process may form a combined recommendation procedure, and the combined recommendation procedure may be available for access via an application programming interface.

The one or more data processing procedures may be available using an application programming interface. The combining process may comprise requesting a first type of procedure using a first API and receiving the results from the first type of procedure using the first API and requesting a second type of procedure using a second API based on the results from the first API and receiving the results from the second type of procedure using the second API.

The combining process may comprise a chaining process. The combining process may comprise forming a combined process comprises a plurality of steps, wherein each step is based on one or more of the plurality of available procedures. The combining process may comprise providing output of a first procedure selected from the plurality of procedures to the input of a second procedure selected from the plurality of procedures.

The combined process may be characterised by the number and/or type of procedures and the order and/or sequence of procedures.

The plurality of procedures may comprise a sorting, ranking and/or a filtering procedure based on at least user data representative of user activity and/or content metadata associated with said user activity.

The method may comprise sorting, ranking and/filtering a set of recommendation candidates generated from at least a first procedure of the plurality of procedure, for example based on at least user data and/or metadata and/or any other suitable data.

The method may comprise obtaining user data representative of user activity and/or content metadata associated with user activity, and wherein the plurality of procedures comprise at least one further procedure, wherein the at least one further procedure comprises at least a sorting, ranking and/or a filtering procedure based the user data.

The plurality of procedures may comprise at least one procedure to generate content recommendation candidates based on a received content item or content item identifier and/or at least one property of a content item.

The plurality of content recommendation procedures may comprise a first type of procedure configured to generate a set of candidates associated with a first score or other metric and a second type of procedure configured to return a set of candidates associated with a second, different score or metric.

The first type of procedure may generate a set of candidates sorted, ranked or filtered by the first score. The second type of procedure may generate a set of candidates sorted, ranked or filtered by the second score.

At least one of the first score and the second score may be determined based on user data and/or the other of the at least one of the first score and second score may be determined based on user engagement data for a plurality of users. The first score and/or the second score may be determined in any other suitable fashion, for example based on any other suitable data.

The user data may be stored in a user profile and the sorting, filtering and/or ranking of the further procedure may use the user profile.

At least one of the procedures is dependent on user data stored in a user profile, and wherein the user profile represents or is indicative of one or more properties or parameters of content metadata based on userx'1 activity and wherein at least one of the procedures comprises a selecting, ranking and/or filtering based on said at least one or more properties.

The user data may comprises or be derived from user record data and/or associated content metadata The combining process may comprise providing data representative of the results from at least one instance of a first procedure to multiple instances of a second procedure to generate respective multiple sets of content recommendation candidates.

The combining process may comprises performing at least two recommendation procedures and displaying the generated candidates as interactive elements of a content selection interface wherein the interactive elements are operable in order to provide the selected content.

The interactive elements may comprise selectable indications. The selectable indications may be selectable to selectively download, stream and/or playback the selected content, which may be on a user device, such as a user device on which the content selection interface is provided.

The combining process may comprise performing a plurality of requests corresponding to one or more types of procedure to generate a corresponding plurality of groups of one or more content recommendations, wherein each group is displayed via an interactive element of a content selection interface, for example, a scrollable carousel.

The plurality of requests may be performed substantially simultaneously.

The content selection interface may comprise a plurality of scrollable carousels. Each carousel may display an associated group of content.

The combining process may be based on a pre-determined set of instructions representing the types and/or order and/or data flow of the combining process. The set of instructions may be executable by processing circuitry to perform the combining process.

Indications of the content recommendation candidates associated with the combining process may be displayed, for example, on a content selection interface on user device, and wherein one or more aspects of the combining process is based on, and/or modified in response to, receiving user input, for example, received via the user device, wherein the displayed candidates or indications of candidates are updated in response to receiving user input.

The combining process may be graphically represented on a graphical user interface by one or more graphical elements and wherein one or more aspects of the combining process is selectable and/or modifiable by interaction with one or more interactive elements.

The one or more aspects of the combining process may comprise data inputs and/or outputs and/or the type of procedures and/or the ordering of procedures. The workflow of the combining process may be graphically represented on the display.

The combining process may comprise performing a plurality of selected procedures selected corresponding to one or more types of procedure to generate a corresponding plurality of groups of one or more content recommendations, wherein each group is displayed via an interactive element of a content selection interface, for example, a scrollable carousel.

The at least one procedure may comprise using the user data to identify one or more of the content item recommendations candidates that represent a closest match with the user data. The method may comprise ranking, filtering and/or ordering the content item recommendations from closest match to least closest match. The method may comprise performing a matching process comprises comparing metadata associated with a content item with metadata associated with or represented by the user data.

At least one of the recommendation procedures may use a machine learning derived model to determine recommendation candidates.

The one or more data processing procedures may comprise at least one of: a preference, related Content, context, mood, collaborative (user based), collaborative (item based), because you actioned, because You Like, Don't Miss, continue watching, popularity, most actioned, previously actioned, episode information, sort, search, Search suggestions, Editorial recommendations.

The plurality of content recommendation procedures may comprise a related content procedure configured to: receive a seed content item identifier identifying a seed content item and obtain metadata associated with the seed content item identified by the seed content item identifier and identify related content comprising content associated with one or more of the same or similar metadata.

The plurality of content recommendation procedures may comprise a procedure dependent on at least a statistic determined using content engagement for a plurality of users, optionally wherein the statistic relates to user engagement and/or user ratings, optionally, wherein the statistic comprises the most popular and/or highest rated over a time period.

The plurality of content recommendation procedures may comprise a procedure based on at least content engagement for a plurality of users, for example, content-item interaction data.

The plurality of content recommendation procedures may comprise a collaborative procedure configured to receive a seed content item identifier or user identifier and identify collaborative content comprising content viewed by said other users who have viewed said seed content item.

The plurality of content recommendation procedures may comprise an aggregating procedure configured to aggregate content recommendation candidates from a plurality of requests.

At least one of the plurality of procedures may be controllable to select the number of generated recommended content candidates.

The combining process may comprise performing a plurality of recommendation procedures to generate a respective plurality of sets of content recommendation candidates and combining said plurality of sets and performing a further procedure from the plurality of procedures on the combined set of recommendation candidates.

Each content recommendation candidate generated from each procedure may be generated together with a score or metric, and the combining process may comprise performing a normalisation process using the score or metric prior to performing a subsequent second procedure using the content recommendation candidate.

The method may comprise providing the content recommendation candidates to a user device configured to provide content to a user.

The at least one the content recommendation procedures may be configured to receive a seed content item identifier and generate one or more recommendations based on said seed content item, wherein the procedure comprises using the seed content item identifier and one or more other items of user data to generate one or more personalised content item recommendations. The one or more other items of user data comprise content item identifiers for content other than the seed content and/or metadata representing at least some properties of the content flagged as the result of user actions.

The method may further comprise obtaining seed features from metadata associated with a seed content item identified by the seed content item identifier; obtaining a user weighting for said seed features based on metadata in, or associated with, the one or more other items of user data; combining the seed features with the user weighting to form a seed profile; and comparing the seed profile with metadata associated with available content to determine the available content most closely matching the seed profile, as the personalised content item recommendations. The method may comprise obtaining the content weighting for the metadata associated with the available content and comparing the content weighting with the user weighting for the seed features.

The user data may comprise content item identifiers for content flagged as a result of a user action.

The filtering, ranking and/or sorting may be based on a popularity, prior to providing the one or more personalised content item recommendations to the user device.

The user action may comprise one or more of: selecting, viewing, purchasing, recording, reading, listening to, playing, sharing, rating, commenting on or otherwise interacting with content.

The method may comprise using at least one first procedure to generate a plurality of non-personalised content item recommendation candidates; and sorting, filtering and/or ranking the plurality of non-personalised content item recommendations using the one or more other items of user data from the user profile. Sorting, filtering and/or ranking the plurality of non-personalised content item recommendations may comprise using the one or more other items of user data to identify one or more of the non-personalised content item recommendations that represent a closest match with the user profile. The method may comprise presenting the one or more personalised content item recommendations to the user in order from closest match to least closest match. Identifying the closest match may comprise comparing metadata associated with the non-personalised content item recommendations with metadata associated with the user profile.

The method may comprise monitoring user activity including identifying content that the user of the user device has interacted with and adding content item identifiers, for the identified content, to the user data.

The procedure may comprise selecting the seed content item identifier based on one or more of: a recency of the user action associated with the content item identifiers; a time of day of the user action associated with the content item identifiers; or a weekday of the user action associated with the content item identifiers.

The content may comprises one or more of: television content; movies; videos; games; books; or music.

The user data may be stored in a first memory resource remote from a user device, the first memory resource storing user data for a plurality of users of a content distribution system; and the available content may be stored in a second memory resource remote from the first memory resource, the second memory resource storing items of content for the content distribution system.

According to a second aspect there is provided a system comprising processing circuitry configured to: open a content recommendation session for a selected user, wherein a plurality of data processing procedures, or operations, are available for use during the content recommendation session, the plurality of data processing procedures comprising at least one type of content recommendation procedure for generating one or more content recommendation candidates based on user data and/or content information wherein the processing circuitry is further configured to perform a combining process using one or more of the plurality of procedures to generate one or more content recommendation candidates, wherein the combining process comprises at least: receiving at least one content recommendation request for the selected user; processing said at least one request using at least a first procedure selected from the plurality of procedures to generate at least one or more content recommendation candidates; providing at least some of the one or more content recommendation candidates to at least a second procedure selected from the plurality of procedures to generate at least one or more further content candidates.

According to a third aspect, there is provided a non-transitory computer-readable medium that comprises computer-readable instructions that are executable to perform a method comprising: opening a content recommendation session for a selected user, wherein a plurality of data processing procedures, or operations, are available for use during the content recommendation session, the plurality of data processing procedures comprising at least one type of content recommendation procedure for generating one or more content recommendation candidates based on user data and/or content information; wherein the method further comprises performing a combining process using one or more of the plurality of procedures to generate one or more content recommendation candidates, wherein the combining process comprises at least: receiving at least one content recommendation request for the selected user; processing said at least one request using at least a first procedure selected from the plurality of procedures to generate at least one or more content recommendation candidates; providing at least some of the one or more content recommendation candidates to at least a second procedure selected from the plurality of procedures to generate at least one or more further content candidates.

In accordance with a fourth aspect, there is provided a computer-implemented method for providing content recommendations for a user of a content distribution system, the method comprising: performing one or more content recommendation procedure selected form a plurality of content recommendation procedures to generate a plurality of content recommendation candidates; performing at least one of a sorting, filtering and/or ranking process on the plurality of content recommendation candidates based on one or more other items of user data, for example, from a user profile.

The method may comprise providing the content recommendation candidates to a user device configured to provide content to the user. Providing one or more of the personalised content item recommendations to the user device comprises instructing the user device to display the one or more personalised content item recommendations for selection by the user.

In accordance with a fifth aspect, there is provided a system comprising a processing resource configured to: perform one or more content recommendation procedure selected form a plurality of content recommendation procedures to generate a plurality of content recommendation candidates; perform at least one of a sorting, filtering and/or ranking process on the plurality of content recommendation candidates based on one or more other items of user data, for example, from a user profile.

In accordance with a sixth aspect, there is provided non-transitory computer-readable medium that comprises computer-readable instructions that are executable to perform a method comprising:

performing one or more content recommendation procedure selected form a plurality of content recommendation procedures to generate a plurality of content recommendation candidates, performing at least one of a sorting, filtering and/or ranking process on the plurality of content recommendation candidates based on one or more other items of user data, for example, from a user profile.

The at least one of a sorting, filtering and/or ranking process may generate a sorted, filter and/or ranked set of personalized content item recommendations.

Features in one aspect may be provided as features in another aspect. For example, method features may be provided as apparatus features and vice versa. For example, any of the features of the first to third aspects may be provided as a feature of the further to sixth aspects.

BRIEF DESCRIPTION

Various aspects of the invention will now be described by way of example only, and with reference to the accompanying drawings, of which:

FIG. 2 is representation of certain database learning tables used by the system of FIG. 1;

DETAILED DESCRIPTION

The following embodiments relates to a system and method of providing content recommendations to users of a content recommendation system, in particular, to a system and method for performing a combining process to combine results from a number of available content recommendation procedures.

Figure 1:
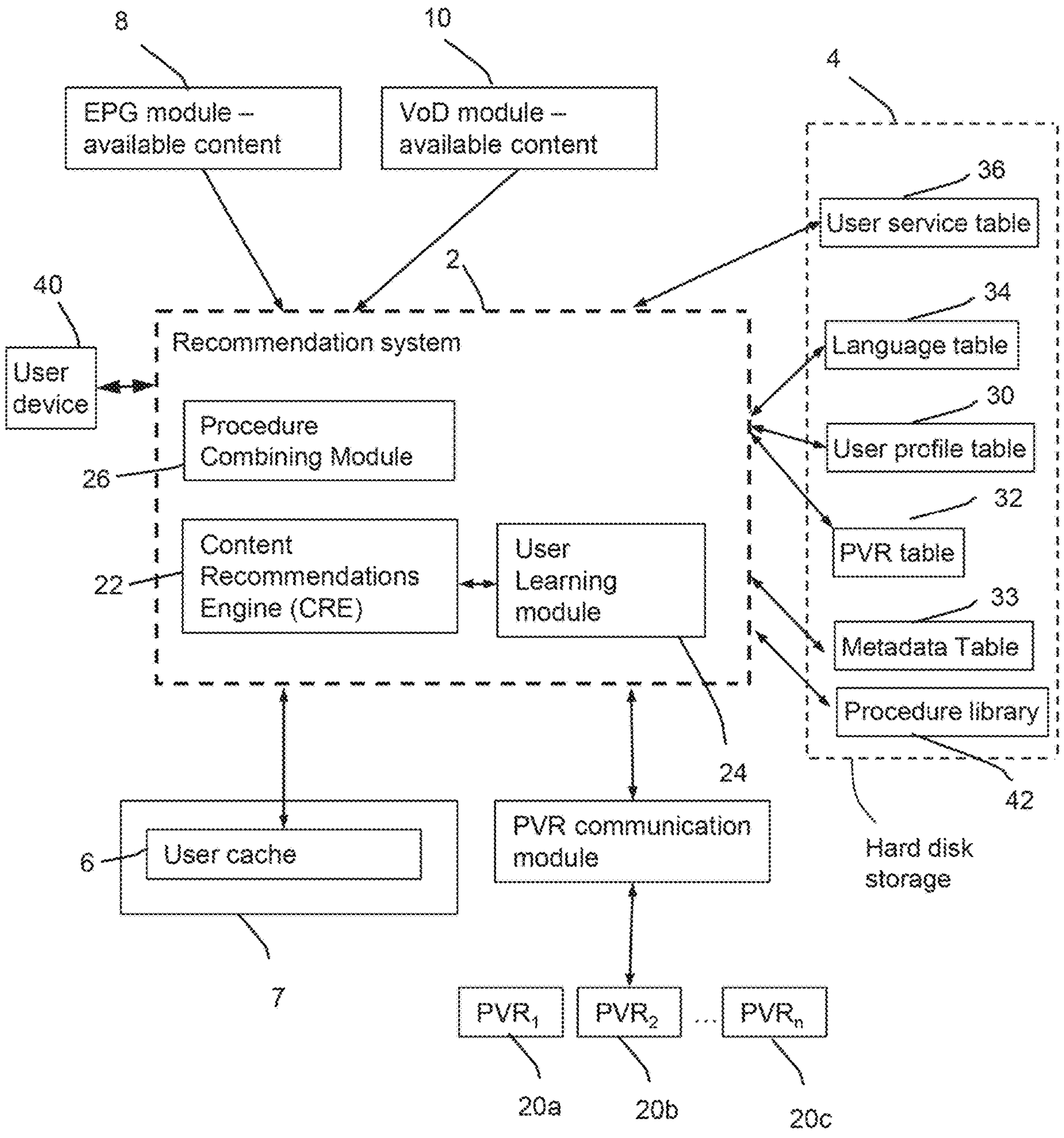
FIG. 1 is a schematic diagram of a digital content recommendation system.

FIG. 1 shows a schematic diagram of content recommendation system according to an embodiment, which is operable to generate content recommendations for users based on first party data in the form of, for example, user actions performed in relation to their selection, viewing and other actions in relation to TV content provided by a TV distribution system, and/or in relation to other content. The content recommendation system is configured to perform one or more content recommendation methods, in accordance with embodiments, including the methods described with reference to FIGS. 4 and 5.

Content recommendations may be provided in real time or near real time for many thousands, tens of thousands or even hundreds of thousands or more users, for example using techniques as described in UK Patent No. GB 2574581 or U.S. Pat. No. 11,343,573, the content of each of which is incorporated herein by reference.

Some example modes of operation are described below in relation to PVRs associated with users, but content may be provided or accessible via any suitable devices, for example set-top boxes, smartphones, PCs or tablets or any other suitable content delivery mechanism.

The system in the embodiment of FIG. 1 comprises a content recommendation system 2 that comprises a content recommendation engine (CRE) or module 22 and linked to a first storage resource in the form of a hard disk storage device 4, which is used to store various user data. The recommendation system 2 is also communicatively linked to a second storage resource in the form of a local storage device that includes at least one cache, for example a user cache 6. In the embodiment of FIG. 1 the local storage device is in the form of RAM 7 but any suitable storage device may be used in alternative embodiments. The user cache 6 may be used for temporary storage of user data obtained from the hard disk storage device 4 during a user session.

As discussed further below, the recommendation system is able to communicate, either directly or indirectly, and either via wired or wireless connection, with very large numbers of users or user devices and to provide recommendations for or derived from such users or user devices. Other than some PVRs which are shown schematically in FIG. 1, only a single user device 40 is shown in FIG. 1 for clarity.

The recommendation system 2 is also linked to sources of information concerning available content, in this case an EPG module 8 and a Video-on-Demand (VoD) module which provide information concerning content available to a user via an EPG (for example, scheduled TV programmes on a set of channels) and via a VoD service. In alternative embodiments, a variety of other sources of content may be available as well as, or in addition to, EPG and VoD content, for example internet content and/or any suitable streamed content via wired or wireless connection.

In the embodiment of FIG. 1, the EPG module 8, the VoD module 10, the recommendation system 2, the User Cache 6, the PVR Communication module 12, the EPG module 8 and the User Learning module 24 are implemented in a server. The server includes communication circuitry that enables communication between the server, or appropriate components of the server, with each of the user devices, and with the content sources, for example, a TV service operator or other content service operator.

Module 26 is a procedure combining module configured to combine a plurality of available procedures into a combined procedure. The module 26 is in communication with a procedure library 42 stored on hard disk storage. The procedure library 42 stores a plurality of callable procedures that are available during a content recommendation session. Each procedure will be understood as a sequence of actions or instructions to be performed. A description of types of procedure that may be available is provided with reference to FIGS. 4 and 5. Each procedure may be understood as a functional block of executable code that receives an input and generates an output based on the sequence of actions or instructions.

It will be understood that the procedures may be any type of executable set of instructions or rules for generating or handling content recommendation candidates. For example, the procedures may be in the form of methods, routines, subroutines, functions, programs, subprograms or similar. The procedures may also be referred to in general as data processing operations or each procedure may comprise a sequence of data processing operations. While FIG. 1 depicts the RCE and module 26 separately, it will be understood that the module 26 may form part of the RCE, in some embodiments.

Any other suitable implementation of the EPG module 8, the VoD module 10, the recommendation system 2, the CRE 22, the user cache 6, the PVR communication module 12, the EPG module 8 and the user learning module 24 may be provided in alternative embodiments, for example they may be implemented in any software, hardware or any suitable combination of software and hardware. Furthermore, in alternative embodiments any one of the components as described in relation to the embodiment of FIG. 1 or other embodiments may be combined with any other one(s) of the components, or any one of the components may be split into multiple components providing the same or similar functionality.

The EPG module 8 and the VoD module 10 obtain information concerning available content from the content sources, for example a TV service operator or other content service operator. The content information comprises metadata of content, for example, television programme metadata. The metadata may be representative of a variety of different content parameters or properties, for example but not limited to programme title, time, duration, content type, programme categorisation, actor names, genre, release date, episode number, series number. It is a feature of the embodiment that the metadata stored at the EPG module 8 and the VoD module 10 may also be enriched with additional metadata, for example by the operator of the system, such that additional metadata to that provided by the content sources or other external sources may be stored.

In the embodiment of FIG. 1 the system operates together with three sources of content for a user device: real-time linear television, for example terrestrial or satellite broadcast television; one or more video-on-demand (VoD) services, and pre-recorded video content stored on one or more personal video recorders (PVR). In alternative embodiments further sources of content as well as or instead of those shown may be used.

The operation of the digital content recommendation system is controlled by the recommendation system 2. As can be seen in FIG. 1, the recommendation system 2 is configured to communicate with the one or more content information modules: the electronic programme guide (EPG) module and VoD module 10. The recommendation system 2 is also configured to communicate with the user cache 6 local to the recommendation system 2, the hard disk storage resource 4 and the one or more PVRs. A data access layer provides a communication interface between the recommendation system 2 and the hard disk storage resource 4. A personal video recorder (PVR) communication module 12 provides a communication interface between the one or more PVRs 20*a*, 20*b*, . . . 20*z* and the recommendation system 2.

The recommendation system 2 has a content recommendation engine (CRE) 22, a procedure combining module 26 and a user learning module 24. The CRE 22 can apply a set of processes or procedures to determine, in real time, content recommendations for a user based on user data and available content.

The user learning module 24 receives data indicative of selections or other actions by a user and builds up a set of user data, for example comprising or representing a user history or profile, which is stored in the hard disk storage 4, and which is used in generating personalised recommendations for the user.

FIG. 1 shows a user action being received by the recommendation system 2. In addition to receiving requests for recommendation, the recommendation system 2 is configured to log user activity. By logging user activity and storing activity over an extended period of time, the recommendation system 2 and the hard disk storage 4 can build up an overall picture of the viewing activities, habits and preferences of a plurality of users. User actions are turned into learn actions by the user learning module 24 to be processed the content recommendation engine 22.

The system of FIG. 1 is configured to operate with a plurality of user devices each associated with at least one user. The plurality of user devices may comprise a large number of devices, for example thousands, tens or hundreds of thousands, or even millions of devices. Each user device may be any device or combination of devices that is configured to enable a user to view or otherwise consume content. For example, each user device may be an internet-enabled device and/or a device for providing video or other content on demand and/or a device capable of receiving a real-time linear television broadcast signal. The user device may be a mobile device, for example a tablet, a smart phone or a laptop. Alternatively, the user device may not be mobile, for example, an internet browser enabled computing device, a smart television or a set-top box. The user device may also have an in-built or associated PVR for recording and storing content in some embodiments.

The user may be a viewer of the user device. Alternatively or additionally, the user may be a subscriber and/or customer of a service accessible through the user device.

The user cache 6 is coupled to the procedure combining module 26 and the content recommendations engine 22, and data stored by the user cache 6 may be used by the procedure combining module 26 and the content recommendations engine 22. The recommendation system 2 can access data stored on the user cache 6. The user cache 6 may be provided in random access memory (RAM) 7.

The hard disk storage 4 is communicatively coupled to the recommendation system 2. The hard disk storage 4 stores data for use by the recommendation system 2. The hard disk storage 4 is configured to store one or more databases. Entries from the databases on the hard disk storage resource 4 can be retrieved by requests made through a data access layer. Entries in the databases may also be updated via the data access layer.

The database(s) at the hard disk storage 4 store user data that is used by the CRE 22 to generate content recommendations. In the embodiment of FIG. 1 a set of database tables is provided that store information concerning the users.

In the embodiment of FIG. 1, the tables may include at least one user service table 36 that represent user service requirements, and at least one user profile table 30 that includes user attribute data that may be considered to represent a user profile. A user profile may include, for example, the following attributes: unique identifiers, for example a user identifier, a subscriber identifier, an anonymous session identifier; one or more unique geographic identifiers; a flag indicating whether or not the user has a PVR; a flag indicating whether or not the user is in debt; a flag indicating whether or not the user has opted out of receiving marketing material; one or more codes indicating one or more preferred languages of the user; a flag indicating if the user has opted out of receiving personal recommendations; the age of the user; the name of the user and the gender of the user.

In the embodiment of FIG. 1, the tables may include various user learning tables that include data representing for example the viewing activities, habits and preferences of each user. The user data can include data representing for examples explicit ratings given by a user to a particular programme or other item of content. It is a feature of the embodiment of FIG. 1 that the user data also includes data representing actions, for instance viewing actions, taken by a user.

For example, if a user selects a programme or other item of content and views or otherwise consumes it for greater than a threshold period of time then a learn action is generated and at least one user data item for that user is stored in at least one of the tables. The data item may include various data including for example start and stop viewing time, time slot identifier, programme identifier, at least some metadata concerning the programme (although such metadata may be stored separately as content data rather than user data in some embodiments, and linked to or otherwise accessed if required, for example by the programme name or other identifier). The user learning module 24 determines whether user data should be stored in the tables in respect of a particular user action or set of actions. For example, if a user only views a programme for a very short period of time, for instance if they are channel surfing, then user data is not stored in the user learning tables in respect of that action. User data can be stored in respect of a variety of different user actions or events, for example selecting, viewing, recording or searching for content.

In the embodiment of FIG. 1 it can be understood that a large part of the user data comprises user history or user action data that represent user actions over a significant period of time.

In various embodiments, there is a limit to how long user data is kept or used. For example in the embodiment of FIG. 1 after a threshold period, for example six months after being collected, items of user data are deleted. Thus, in some embodiments the user data for a particular user may include only relatively recent user action data, although the amounts of data may still be substantial.

In the embodiment of a FIG. 1, a distinction is made between different types of user and different sets of the tables are stored for the different types of users.

FIG. 2 is a representation of certain database learning tables stored on the hard disk storage resource 4 of the embodiment of FIG. 1. The system supports different categories of user. The tables of FIG. 2 correspond to different categories of user. The categories in this embodiment are: customer, subscriber and anonymous. Subscriber can, for example, refer to combined subscriber mode or time-slot subscriber mode. Anonymous can, for example, refer to cookie and/or session modes.

A customer may be a user who uses a service or content source. A customer profile may store one or more of the following attributes in some embodiments: preferred features; indication of preferred viewing times e.g. day, start and end times. The customer profile table also stores a list of the favourite content item group information: content source (e.g. EPG or VOD) and unique identifiers for content item groups.

A subscriber may be a person who has subscribed to a particular service rather than the individual who is using the service. For example, the subscriber can be an account holder or an entity that represents a household. Individual users may be associated with a subscriber. There are at least two modes of operation of subscriber profiles. The first is combined mode, where data for the subscriber (for example attributes and/or subscriber actions) are used to generate content recommendations. In that case, the content recommendations may be based on attributes and/or user actions for a plurality of individuals associated with the same subscription, for example different members of the same household. The second is time-slot mode where content recommendations are generated in dependence on the particular time slot in question. For example user data generated for a particular time slot may be used selectively in generating content recommendations for a particular time slot (potentially with user date generated for other times slots being ignored or weighted to be of less significance) and/or with different rules and/or attributes being used for different time slots. For instance, there may be a rule that no adult content be recommended for morning or afternoon time slots, only for late evening or night-time time slots. Similarly, greater weighting may be given to children's programmes for certain time slots, for instance late afternoon time slots, making recommendations of children's programmes more likely during those time slots.

Anonymous profiles are used to recommend content when neither the individual customer or subscriber to a service is known. For example, for a web user who has not logged in is an anonymous user. There are two modes of operation of anonymous profiles. These are session mode (either single-session or multi-session mode) and cookie mode.

In single-session mode preferences of the anonymous consumer are stored in memory for the duration of a single session and then removed from memory at the end. In multi-session mode preferences of the anonymous consumer are kept in memory over more than one session. The anonymous profile is identified over more than one session using a unique session id stored in the anonymous profile.

In cookie mode, the recommendations engine 22 can perform anonymous session tracking using cookies, wherein on a first request a cookie containing the unique identification is added and in later sessions used to identify the anonymous user. This works in a web environment. A cookie session profile holds a list of cookies that are known to the system together with data referring to when the cookie was created or last accessed.

For each user of all categories, there may be separate groups of learning tables. In FIG. 2, the learning tables shown are "learned language", "exclude content group", "content item ratings", "feature ratings" and "watched episodes". These tables are shown by way of example. Other tables may also be stored in the embodiment of FIG. 1. Each user may have explicit preferences and implicit preferences. Explicit preferences are information the consumer tells the system by, for example, by entering a questionnaire. Implicit preferences are information learned by the system through user actions. Data corresponding to user actions for the purpose of learning are stored in the learning tables.

The learned language table 32 stores data relating to audio languages of content items that have been user actioned by the user. For example, the feedback table can store learned language information, the date at which the language was learned and an indication of whether or not the entry has been aged out.

The exclude content group table stores data corresponding to content explicitly excluded by the user. For example, the feedback tables also contain information on content items and content item groups that have been manually excluded by the customer. For example, for individual content items that have been excluded this information includes: identifier of the content item; content source; data and time of exclusion; series title of content item; client type ID (e.g. web, call centre, set-top box). For content item groups, this information includes: customer identifier, time and date content item group excluded; content source; client type ID. In both case, a flag is included that indicated whether or not the exclusion has been aged out.

The content item ratings table stores data representing features of content such as the features, actors, channels. Feature ratings allows learn actions to specify features of content information instead of the content item. A customer is capable of applying ratings to a content item. Rating information is stored in the customer feedback table and includes: time and date rating given; customer identifier; activity identifier; name and identifier of content item rated; content item group identifier if content item associated with a content item group; rating value; a scaled rating value; feature ratings; content source ID; client type ID; series title of content tem and content item instance identifier. A flag is also stored to indicate if a recommendation has aged out or not. A feature rating made by a customer can also be stored on a specific list of features and/or sub-genres.

The watched episodes table stores data corresponding to last actioned episode of a series actioned by a user. For example, for each customer the episode history for customers is stored. This includes a series identifier; a series title; a season and episode number, and the date and time the user action occurred.

In alternative embodiments, different data tables or combinations of data tables may be stored.

It can be understood from the description above concerning user learn actions that in a system with a large number of users, user data may be generated almost continuously as users watch programmes and perform other actions. Such user data is stored in the hard disk storage 4.

It can be understood from the description of the nature of the user data, that for a particular user there may be large numbers of individual data items for each user, for example there may be individual data items for each individual relevant user action over the preceding 6 months or other predetermined or selected time period. For example each learn action (e.g. each time a user has watched or recorded a programme at any time during the previous six months or other relevant time period) will have its own data item (e.g. table entry) in the user data. Thus there may be several hundreds or even thousands of data items (e.g. table entries) that need to be read from the hard disk storage 4 for a particular user.

It is a feature of the embodiment of FIG. 1 and at least some other embodiments that during a session for a particular user, the user data for that user may change or be added to. For example, a user may carry out a number of user actions. These may include, for example, switching channel or selecting new content items, watching a content item, pausing a content item, logging in and out of the service, recording of a content item on a PVR or other recording device, or even selecting a piece of content based on a content recommendation provided earlier in the content recommendation session. User actions are logged by the recommendation system 2 during the session. Some of these user actions are recorded as learn actions during the session. As discussed, the user learning module 24 has a set of rules for determining which user actions are learn actions.

A learn action may be based on an indication that a user has watched a content item for a specified period of time. The information may be used as an indication of user preferences. As discussed, a minimum event time filter may be implemented to ensure that short period events are not recorded and/or used. In this case, a learn action is only generated if an event exceeds the minimum event time filter. In addition, there may be a rule that only one learn action for each content item should be generated. For example, a viewer may watch a programme and switch channels during an advert break and then return to the original programme. In such an event, only one learn action may be generated according to some embodiments.

New user data, for example new table entries, corresponding to the learn actions for the user ultimately are stored in the hard disk storage 4. However, it is a feature of the embodiment of FIG. 1 and of at least some other embodiments that user data for the user stored in RAM 7 during a session for that user is updated, based on the learn actions for the user occurring during the session, on an ongoing basis. Thus, the user data for a user stored in RAM 7 may change during a session for the user, such that processes are performed based on the most up-to-date user data.

In the embodiment of FIG. 1, the user data for a user is overwritten by the user data stored in RAM 7 (which may be more up-to-date) in response to the end of a session for the user. For example, the updated user data can be provided to the hard disk resource 4 in response to an expiry event. An expiry event may be a user action corresponding to a user terminating a session, terminating watching a content item (e.g. the end of a programme playback) or terminating recording of a content item. Alternatively an expiry event may occur a pre-determined period of time after a user action. For example, an expiry event may be a pre-determined period of time elapsing after a user action corresponding to a user commencing a viewing session.

In some embodiments, all of the user data for the user stored in the hard disk storage 4 may be overwritten by the user data stored in RAM 7. Alternatively, only changes to the user data may be written from RAM 7 to the hard disk storage 4. In some embodiments user data is written to the hard disk storage 4 periodically or in response to at least one of processing capacity or communication capacity being available. Higher priority may be given to updating the user data in RAM 7 than to updating the user data in the hard disk storage 4.

In some embodiments, the user data for a user may be maintained in RAM 7 after the end of a content recommendation session for the user and only deleted from RAM 7 in response to the user data from RAM 7 having been written to the hard disk storage 4.

In at least some other embodiments, each time new user data is generated (for example, when a learn action is generated during a session for a user) it is written both to RAM and to the hard disk storage 4. Thus, an attempt may be made to maintain up-to-date user records for the user in parallel in both RAM and the hard disk storage 4. For example, one option is to provide the updated user data to the hard disk storage 4 at substantially the same time as updating the user data in the user cache 6. Alternatively, priority may be given to maintaining up-to-date user data in RAM 7, with the user data in the hard disk storage 4 only being updated on an as-and-when basis.

Information relating to content available on a real-time linear television broadcast may also be received by the user device and is typically presented to a viewer via an electronic programme guide. The electronic programme guide is interactive. The information relating to the real-time linear television broadcast may be provided by either the service provider or by a third-party content information provider.

The information may be delivered to the user device as part of the broadcast or may be provided through alternative means. For example, an internet enabled set-top box may receive a satellite broadcast carrying the content but receive information relating to the broadcast via an internet connection.

The user devices of the system of FIG. 1 comprise or have associated with them local storage devices in the form of PVRs, and each PVR may be considered to represent a content source. Each user may have a PVR for recording broadcasted content and/or for downloading and storing previously broadcast content. The PVR may be part of a user's set-top box or it may be a separate device. The recorded content is stored on a memory of the PVR to be viewed at a later time. FIG. 1 shows a set of n personal video recorders: $PV_1$, $PV_2$, . . . , $PV_n$. Each PVR corresponds to a different user. Each PVR has a collection of content recordings stored on their respective memories. Typically each PVR will have a different selection of stored programmes from the other PVRs. However, more than one PVR may have one or more common programmes stored on their memories at a given time. For example, user of $PVR_1$ and user of $PVR_2$ may have recorded or downloaded the same content item or series of content items. Each PVR may have content items that are not available from other content sources, for example because they are not made available on VoD or have not been re-broadcast. This may also be a result of the age of the content item. For example, the content item may have been available for a certain amount of time from another content source but is no longer available.

In alternative embodiments, the PVRs or other data stores for storing content for users may be implemented in forms other than local storage devices. For example, the data stores may be implemented as storage areas in a cloud storage system or other networked, remote, and/or virtual storage system.

The PVR communication module 12 of FIG. 1 is an interface between the PVRs 20*a*, 20*b*, . . . 20*z* and the recommendation system 2. The recommendation system 2 collects identifying information relating to the content items stored on the PVRs 20*a*, 20*b*, . . . 20*z*. Content items from the PVR of the user can then be taken into consideration in generating content recommendations.

In alternative embodiments, any other data stores, for instance local storage devices, for example any storage devices included in or associated with user devices, may be used as well as or instead of PVRs. In some embodiments, the data stores may comprise data stores forming part of a cloud storage system or other remote and/or networked and/or virtual storage system. Furthermore, the items of content in question are not limited to comprising video content and may comprise any suitable type of content, for example audio content, image content, virtual reality content or augmented reality content.

There is description above concerning metadata or other content information that may be used by the system. Content information may, for example, include contain scheduling information (e.g. start and end times for programmes, series information) together with content information regarding the programme itself (e.g. programme description, age rating information).

Content items, for example programmes, that are scheduled in an electronic programme guide have associated content information (metadata). Information about content available from this source is stored in the EPG content source table. In a similar fashion to EPG content items, information for video on demand (VOD) content items are stored on the VOD module 10. EPG content items and VOD content items sharing certain characteristics can be arranged into groups. In addition to above, content items are stored on PVRs and have associated information. A group of EPG content items may be considered as equivalent to a broadcast television channel. VOD content items can be grouped into logical groups, for example, movie categories. VOD content item groups can be used to enable or restrict access to content items on a per customer basis. PVR content information is collected and stored in the PVR table 32.

For each content item group, either EPG or VOD, the information that is stored may include: an identifier for the group; a name for the group; a flag indicating if the group is free to view and therefore available to all customers; an indicator of video format of the group e.g. unknown, standard definition, high definition and 3D; one or more language labels; primary and secondary geographic area information. Concerning VOD content item groups, the primary and secondary geographic information can be used to allow customers from different countries access to different content. If the group is associated with a channel then an identifier and mapping to the channel may also be stored. One or more content item groups can be associated with a channel number.

Single content items (e.g. programmes) also have associated information and characteristics. Stored content item information can be constant or variable. Constant content item information has values that are the same for all instances of the content item. Variable content item information has values that vary between different instances of the content item. For example, the same episode may be shown at two different times. The two instances of the same episode share constant characteristics, such as duration and rating but different schedule times, for example.

Constant content item information includes: a unique identifier; duration of the content item; the certificate of the content item e.g. the age rating; the year the content item was released; the critic rating for the content item; the original audio language for the content item; the season and episode numbers; series title information and/or identifier; content item description, and a primary language. The primary language may or may not be the same as the original audio language. For multi-language content items, translations of the title and description can be stored. Furthermore, available broadcast language information can be stored and an indicator to indicate the type of language available. For example, the language may be primary audio language, dubbed audio, subtitled and/or signed.

Further information stored for content items includes: genre and sub-genre information and names associated with the content item. A given name can be associated with, for example, an actor or director involved with or appearing in the content item. For a given name associated with the content item, an identifier for the role in the content item is also stored. In addition, an indicator of the rank of importance of the name and/or the role in the content item may be stored. The rank may be high for a more important role in the content item. For example, a given actor playing a leading part would be assigned the highest rank available.

Although the system of the embodiment of FIG. 1 includes hard disk storage 4 and RAM 7, any suitable other memory devices or types of storage may be used as well as or instead of the hard disk storage 4 and/or RAM 7 in alternative embodiments.

Figure 3:
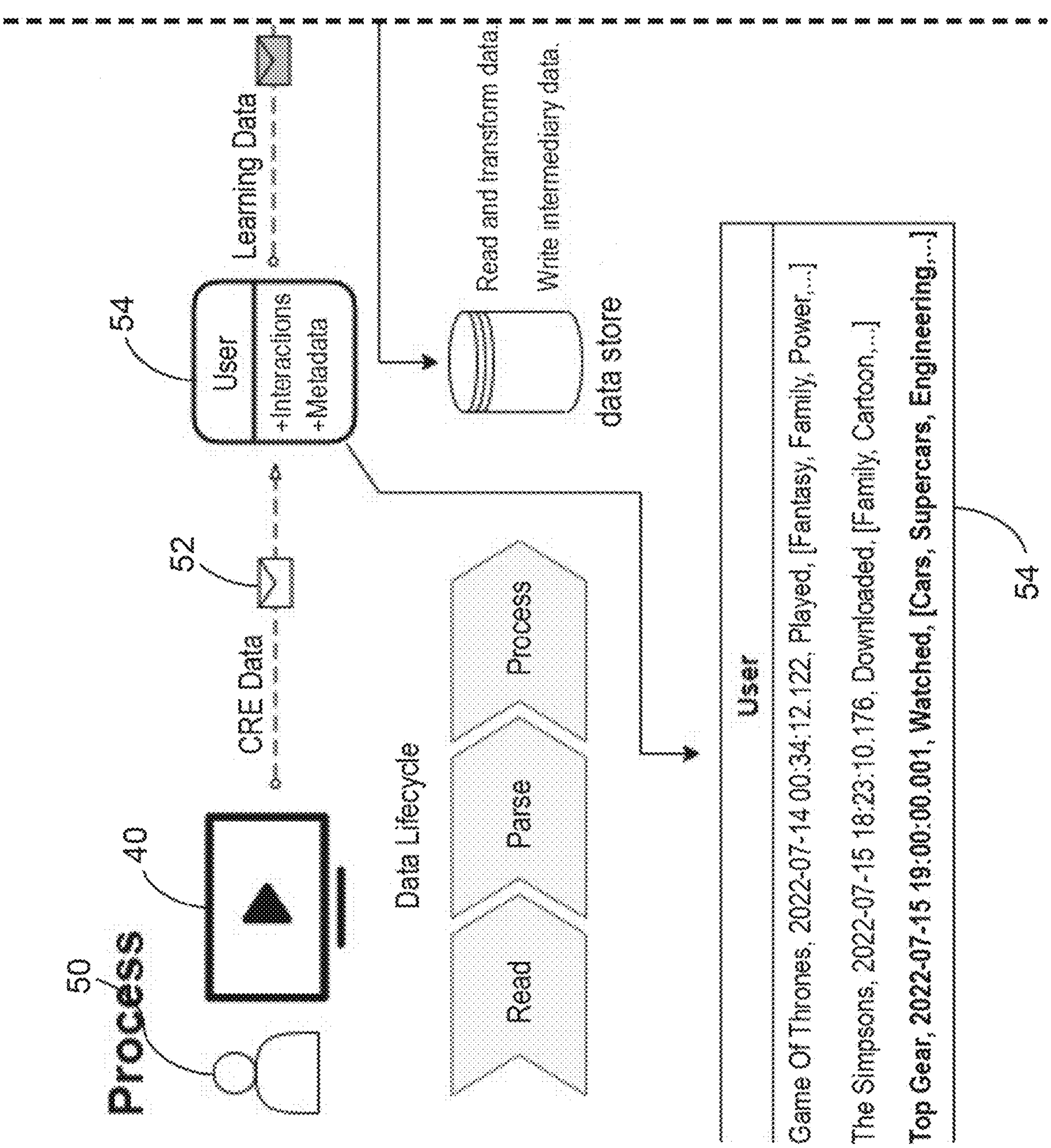
FIG. 3 is a schematic illustration of the generation of user records using the system of FIG. 1.
Figure 3:
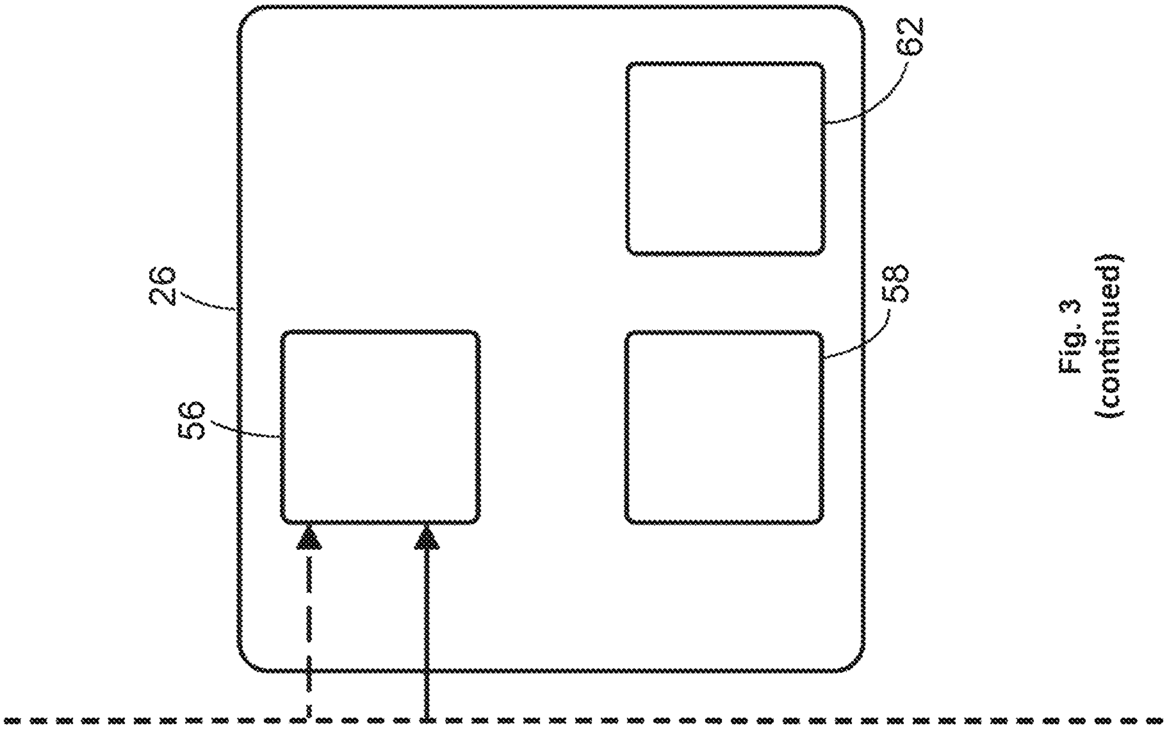

FIG. 3 is a schematic overview of the operation of the content recommendation engine. As part of a session, the content recommendation engine is configured to offer a number of operations to be called using an API. As an example, the content recommendation engine is configured to offer to content recommendation request FIG. 3 shows a user 50 watching a television programme that they have selected on user device 40. Data 52 representing the user's activity is sent to the recommendation system 2 and a learn action, as mentioned above, is performed that results in at least one user data item for that user being added to at least one of the tables. The user data item may comprise data concerning the item of content and data concerning the viewing, for example start and stop times for the viewing.

The collection of data items stored in the tables concerning the user, for instance, viewing of content by the user may be referred to as a user record for the user.

A user record 54 for the user is illustrated schematically in FIG. 3. An expanded version of at least part of the user record is also shown in FIG. 3 for purposes of illustration. In this example, the user has performed actions in relation to three items of content. In particular, the user has played an episode of Game of Thrones on 14 Jul. 2022, has downloaded an episode of The Simpsons on 15 Jul. 2022, and has just watched an episode of Top Gear on 15 Jul. 2022. Some of the metadata associated with each item of content in the record is shown in FIG. 3. For example, at least the meta data items cars, supercars and engineering are associated with the Top Gear episode. In practice there will be many more items of meta data associated with each item of content.

In general, a user record 54 will include records of far larger numbers of items of content than shown for the purposes of illustration in FIG. 3. However, such a small number of items content might be found for a new user or for a temporary user of a system. For example in some embodiments, the system may be used for a user who is a guest in a hotel or traveller in a vehicle or transport system.

The user data in respect of the user 50 is sent to the content recommendation engine 22 in order to generate or update a user profile for the user 50.

The content recommendation module 22 in this embodiment then performs a search of various data sources 56, for example in the cloud, to determine any other information concerning the item of content. For example, various databases can be consulted that include additional information concerning television programmes or other items of content.

In the present embodiment, the record for the item of content and any other information found from the search of data sources 56 is subject to processing by sub-module 58 that match the meta data and other information for the item of content to an ontology of meta data terms that are maintained by the system. Thus, the meta data for the item of content can be enriched, corrected or supplemented.

In the present embodiment the ontology consists of around 38,000 features that can be used as meta data to represent items of content. The ontology defines features in the format <context>:<keyword>. Features describe the content and include subjects, settings, themes and characters (for example, Wimbledon may contain the terms—subject: tennis, sports competition: Wimbledon, theme: sports). Any other suitable ontology can be used in other embodiments. In some embodiments, no ontology is used and the raw metadata associated with the item of content (for example, provided by the content maker, distributor or broadcaster) is used without amendment or enrichment.

The metadata for the item of content is stored in the user record in the hard disk storage 4.

As described above, each user has a stored user record or user profile. The system is configured to provide a plurality of content recommendation candidates to a user based on the similarity between the user record and the content metadata.

Operation of the system of FIGS. 1 and 3 is described in the following. As a first stage, the user 50 initialises a viewing session through a first initiation event. An initiation event can, for example, be a user logging on to a service provider or turning on the user device.

The initiation event is communicated to the content recommendation module 2 via a communication channel between the user device 40, for example a set top box or other device, for example at the user's home or other remote location, and the content recommendation module 2. In the embodiment of FIG. 1 there is direct communication between the user device 40 and the content recommendation module 2. In alternative embodiments, communication between the user device 40 and the content recommendation module 2 is mediated or passes through, for example a content provider, for instance a TV system operator to which the user subscribes. The initiation event may be treated automatically by the content recommendations module as being a request for recommendations for the user.

In response to the initiation event, the user is then presented, via a display of the user device 40, with a content selection screen displayed on a display screen and/or user interface, which presents the user with a choice of viewing different content items from the content source. For an EPG content source, the content selection screen may form part of the EPG itself. For a VoD content source, a dedicated user interface may be presented. It is a feature of the embodiment of FIG. 1 that the choice of content items includes content recommendations generated by the content recommendation system of FIG. 1 and communicated to the user device. In one mode of operation it is a requirement that the content recommendations should be provided almost instantaneously, for example within a few hundred milliseconds, so that they can be included on the user interface together with other available items of content, for example live TV schedules, as soon as the user interface is displayed to the user.

In response to the initiation event a start time to the viewing session is logged by the CRE 22, for example, to coincide with the initiation event, a content recommendation session is opened and user data, associated with the user, are retrieved from storage on tables in the hard disk storage resource 4 and loaded to the user cache 6 in RAM 7. The user data are maintained in RAM 7 throughout the content recommendation session.

The CRE 22 also maintains content data in the RAM 7, for example any suitable data relating to properties of the content, such as metadata obtained from the EPG module 8 and the VoD module 10. The content data stored in RAM 7 may be updated periodically or in response to changes in the data stored, for example, at the EPG module 8 and VoD module 10. By caching the content data in RAM processing and data access speed may be increased.

Following retrieval of user data and obtaining content source information, the CRE 22 is configured to use the user data located in the user cache 6 together with the available content information as part of a content recommendation process. The content recommendation process is performed in accordance with embodiments, for example, as described with reference to FIGS. 4 and 5.

Once the CRE 22 has performed the content recommendation process, the content recommendation(s) generated by the CRE 22 are then transmitted to the user device 40 either directly or indirectly. In some embodiments the content recommendation(s) are transmitted to a database, server or other device, for example a third party device. The content recommendation(s) may be further processed and/or may be transmitted onward to then user device either immediately, at a later time or upon request. The content recommendation (s) may be transmitted in any suitable fashion either to the user device, or to the database, server or other device. In the present embodiment, software installed at the user device 40 determines whether or how the content item recommendation are displayed on the user interface.

It can be understood that the time constraints on providing content recommendations can be significant, given that personalised content recommendations may need to be generated on the fly, particularly as it may be necessary to provide personalised content recommendations for tens of thousands, hundreds of thousands, or even millions of users substantially simultaneously in the case of systems with large numbers of users and during busy periods such as peak viewing periods.

It will be understood that the CRE 22 may maintain content recommendation sessions for a plurality of the users and may maintain in the RAM user data for said plurality of the users substantially simultaneously. For example, user data may be maintained in the RAM 7 for thousands, hundreds of thousands or even millions of users substantially simultaneously, depending on the RAM storage capacity available and the number of subscribers or other users associated with the system.

At the start of a content recommendation session for a user the user data, including all of the various table entries, for the user, are read from the hard disk storage 4 and stored in the user cache 6 in RAM 7, or any other suitable local or rapidly readable storage resource in alternative embodiments. Throughout the content recommendation session the user data stored in the user cache 6 in RAM 7 is used by the CRE 22 to generate content recommendations for the user. This can provide a significant time saving compared to having to read the user data from the hard disk storage 4 each time a content recommendation is needed during the session. At the expiry of a session, the user data for the user is deleted from the cache. The expiry of the session may occur for example in response to no user actions have been received for a pre-determined time period, in response to a user logging off a session or switching off a user device, or in response to loss of communication with the user device. If a new content recommendation session for the user subsequently begins, the user data is read again from the hard disk storage 4 and stored in the user cache 6 in RAM 7.

Figure 6:
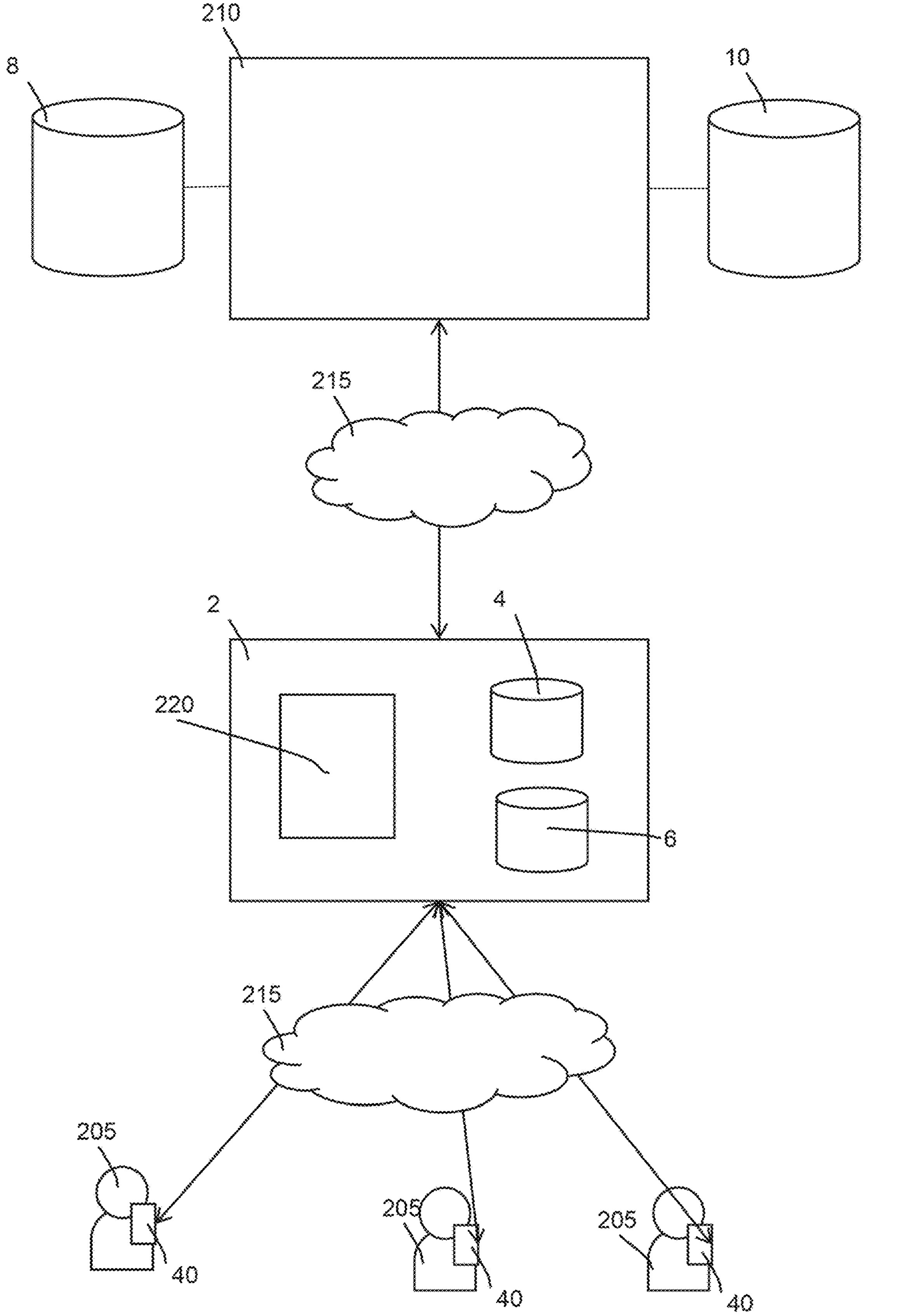
FIG. 6 is a schematic of the system of FIG. 1.

There is description above concerning metadata or other content information that may be used by the CRE 22 in providing content recommendation, FIG. 6 shows content information made available to the content recommendations engine 22 in some embodiments. The content information can contain scheduling information (e.g. start and end times for programmes, series information) together with content information regarding the programme itself (e.g. programme description, age rating information).

In some embodiments, metadata items may be mapped from an ontology (e.g. the ontology of 38,000 items) to other metadata items in the ontology. Weightings or confidence scores are associated with the mappings in some embodiments. The ontology represents a pre-determined set of properties and/or parameters. The content metadata for content items (or as collected in user data) corresponds to properties and/or parameters selected or assigned weights and/or values from this pre-determined set. The at least one property of the piece of content may comprise a set of tags or other metadata representing properties of an item of content. In the system, the metadata is stored on hard disk storage in metadata table 33.

As part of a content recommendation session, a number of different types of recommendation procedures are available to be requested, as described above. In particular a number of procedures may be combined.

Any suitable content recommendation procedures may be combined. These include procedures, for example based on a weighting, scoring and/or matching process generated based on previous user actions, and matching to available content. In a simple example, if it is determined from the user data that a user has previously watched movies starring a particular actor, or watched football matches featuring a particular team, then the CRE 22 may produce a recommendation for the user to watch a movie or other content featuring that actor, or a programme concerning that football team, if such movie, programme or other content is currently available or will soon be available via the available content sources. It will be understood that the content recommendation procedures may be more sophisticated and, may be for example based on similarities or cross-correlations between different content parameters and user actions and properties based on large amounts of historical data. At least one of the recommendation procedures may use a machine learning derived model to determine recommendation candidates. As a non-limiting example, machine learning techniques such as clustering algorithms for clustering objects that share similarities, such as K-means clustering or neural network based techniques and/or Kohonen based techniques may be suitable.

The content metadata may correspond to values for one or more properties or parameters or characteristics, such as programme title, time, duration, content type, programme categorisation, actor names, genre, release data, episode number, series number, style, mood, language and theme. The properties or parameters or characteristic may include one or more of the following: Audience; Award; Category; Character; Character Type; Concept Source; Director; Format; Franchise; Host; Milieu; Mood; Producer; Person; Subcategory; Scenario; Setting; Sports Competition; Studio; Style; Subject; Team; Theme; Time Period; Writer. These properties or parameters will be understood as a non-exhaustive and non-limiting list. The metadata is represented by metadata items having a value for such properties or parameters. The collected metadata can be considered as representative of user interests and/or preferences based on previous interactions with the content. The metadata items may be provided together with a score so that the metadata represents a degree of the preference or interest for that content property or parameter.

The initial content metadata may be referred to as user profile features and the generated content metadata may be referred to as discovery features.

As described above, the procedure combining module is configured to obtain a plurality of procedures from the procedure library and combine the procedures, for example, in accordance with a set of combining rules or as part of an interactive session. An overview of a combining process and further non-limiting examples of combining processes are described with reference to FIGS. 4 and 5.

Operation of the content recommendation system to provide a combined recommendation procedure is described with reference to FIG. 4 and FIG. 5. In the following embodiments, a combining process is performed to combine different types of content recommendation procedures.

It will be understood that requests and results of difference procedures may be communicated between different parts of the system using one or more application programming interfaces. The API defines the parameters and other data to be included in a request and the form and format of the results from the request.

While the embodiments describe combining results of different available operations, it will be understood that, from the perspective of an end user (for example, a service operator or end user) the combined operations may be combined together as a further available process (for example, as a separate API procedure). The system thus receives the request and performs the combination of operations based on the available data processing operations, in accordance with the set of rules, and returns the results.

As described with reference to FIG. 1, the content recommendation system provides a plurality of data processing procedures available during a content recommendation session. combining. In accordance with an embodiment, one or more of these data processing procedures may be combined to offer alternative functionality to each operation considered individually.

Figure 4:
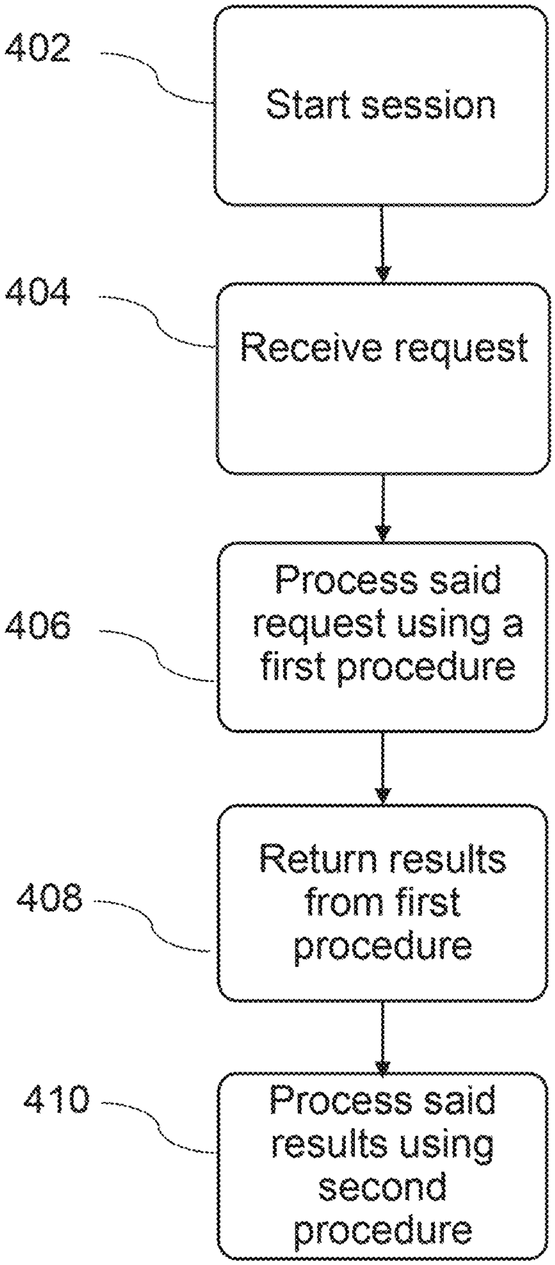
FIG. 4 is an overview of a method of generating content recommendations for a user in accordance with an embodiment.

FIG. 4 describes a method of combining data processing operations in accordance with an embodiment. A number of non-limiting examples are then provided for purposes of illustration.

As an initial step a content recommendation sessions is commenced as described with reference to FIGS. 1 and 3. As an initial step, in the present embodiment, a set of rules for a combining process workflow are retrieved. It will be understood that, in the present embodiment, a pre-determined set of rules are obtained, however, in some embodiments, the combining process may be an interactive process to allow a user to combine different types of operation based on user input.

At step 402, a content recommendation session is started. In the present embodiments, the plurality of content recommendation procedures are transferred from hard disk storage to RAM 7 in response to the start of the content recommendation session. In the present embodiment, a set of combining instructions representing the combining process workflow are also executed. The set of combining instructions represent the order and data flow of the combined process.

At step 404, a content request is received for a selected user. In the system of FIG. 1, the content request may be received, for example, from the user device.

At step 406, the request is processed using a first type of procedure selected from the plurality of operations, in accordance with the combining instructions. The first type of operation outputs results data at step 408. In the present embodiment, the first type of procedure is a content recommendation procedure and the output data represents a plurality of content recommendation candidates generated in accordance with the content recommendation procedure.

At step 410, the results from the first type of procedure are provided to the second type of procedure, in accordance with the combining process instructions. In the present embodiment, the second type of procedure is a ranking, sorting and/or filtering procedure. The second type of procedure thus ranks, sorts and/or filters the set of content recommendation requests.

It will be understood that the combining instructions represent the types and/or order and/or data flow of the combining process and may be executed by a processing circuity.

FIG. 4 describes a procedure combining process in overview. In the following, a number of non-limiting examples of procedure combining processes are described. However, it will be understood that the procedure combining process may include different combinations and data flows between different types of procedure. The combination of procedures allows additional functionality to be provided using a set of pre-defined and reliable procedures. The combining of procedures further allows customized content recommendation requests to be formed.

While FIG. 4 depicts a sequence of two procedures, it will be understood that further procedures may be performed.

While the above data flow is describes, it will be understood that data may be passed between different procedures as pointers and/or identifiers. For example, while a set of content recommendation candidates are described as passed between procedures, it will be understood that, in some embodiments, only identifiers for the content recommendation candidates are passed between procedures.

In the above-described embodiments, combinations of different types of recommendation procedures are described. The following non-exhaustive description of different types of procedures stored in the procedure library 42 and are available to be combined is provided.

Briefly, the one or more data processing procedures may include the following classes of recommendation: a preference, related Content, context, mood, collaborative (user based), collaborative (item based), because you actioned, Because You Like, Don't Miss, continue watching, popularity, most actioned, previously actioned, episode information, sort, search, Search suggestions, Editorial recommendations.

A preference procedure generate content recommendations based on user interests and/or preferences derived from user activity. In further detail, a preference type request compares user data, stored in a user profile to content information for the available content and generates content recommendation candidates based on best matches. In some embodiments, the user interests and preferences are represented in the user data by content metadata items and weights collected based on user activity and learn actions.

A context procedure generates content item recommendations based on a desired context. In general, context data may represent any characteristic, property or parameter that a subgroup of the content items have in common. The desired context may comprise, for example, context keywords or facets taken from a list or any other suitable content attributes. The desired context may include descriptive content metadata or alternative content characteristics, such as, running time, language, format, age rating. A desired context may be a grouping of more than one of these property, parameters or characteristics. In a context procedure, the context is provided to the procedure as, for example, a list of desired contexts and the output matches the content to the desired contexts. The context keywords or facets will overlap or be in a relationship with content metadata. A mood based recommendation may be considered as a special case of the context recommendation, with the context being passed as one or more of a selected set of moods.

A collaborative procedure can be either item based or user based. For an item based collaborative procedure, the procedure is configured to receive a seed content item identifier and determine content recommendations based on the viewing history of other viewers that have also viewed this item identified by the seed content item identifier. For a user based collaborative procedure, the procedure is configured to receive user data, for example, in the form of a user profile, and identify other users that are similar to the user and then identify content based on content viewed by the similar uses. Both approaches use collaborative data for a plurality of users.

A related content procedure may be configured to receive a seed content item identifier identifying a seed content item and obtain metadata associated with the seed content item identified by the seed content item identifier and then identifying related content comprising content associated with one or more of the same or similar metadata.

A "Because you Actioned" procedure may be considered as request that uses a seed content item or item identifier as an input. This request generates further recommendation based on content item that has been viewed or actioned by the user. The request could be a related item request or, for example, a collaborative item based request.

A "Because You Like" procedure is a request based on a one or more features of a user profile that has a high weighting (indicating a user preference for that features) and selects one or content items that has this features. This request is similar to a context request, with the context being a feature taken from the user profile.

A continue watching recommendation generates content item recommendations based on content items that have been previously watched but not completed and/or are part of an incomplete group. For example, this procedure may return a content item that a user has started to view but has not completed.

Popularity and most actioned searches can be considered as special cases of recommendation procedure that use statistics obtained for the plurality of users. The popularity request returns the most viewed content based on activity for the plurality of users. The most actioned searches return content that is most actioned (for example, as a result of user actions in contrast to just viewing).

A sort operation allows sorting of content recommendations, for example, in accordance with a score or metric. The sorting operation may place a plurality of content recommendation candidates in an order based on one or more properties, parameters or characteristics.

The search operation returns content recommendation based on one or more specific search terms. The search may be performed on a title level or may relate to content metadata. The search operation may return a number of search suggestions that may not directly correspond to the search keyword but are related.

The editorial recommendation request returns a preselected set of content recommendation candidates, preselected by a person.

The "Don't Miss" request automatically track series that a user has been viewing. A Don't miss action will return amongst its candidates the next episode of series in a series a user has been viewing.

An episode information procedure uses information for a particular episode of a series (for example, an episode that a user has recently watched or actioned) and recommends content based on the episode information.

Figure 5:
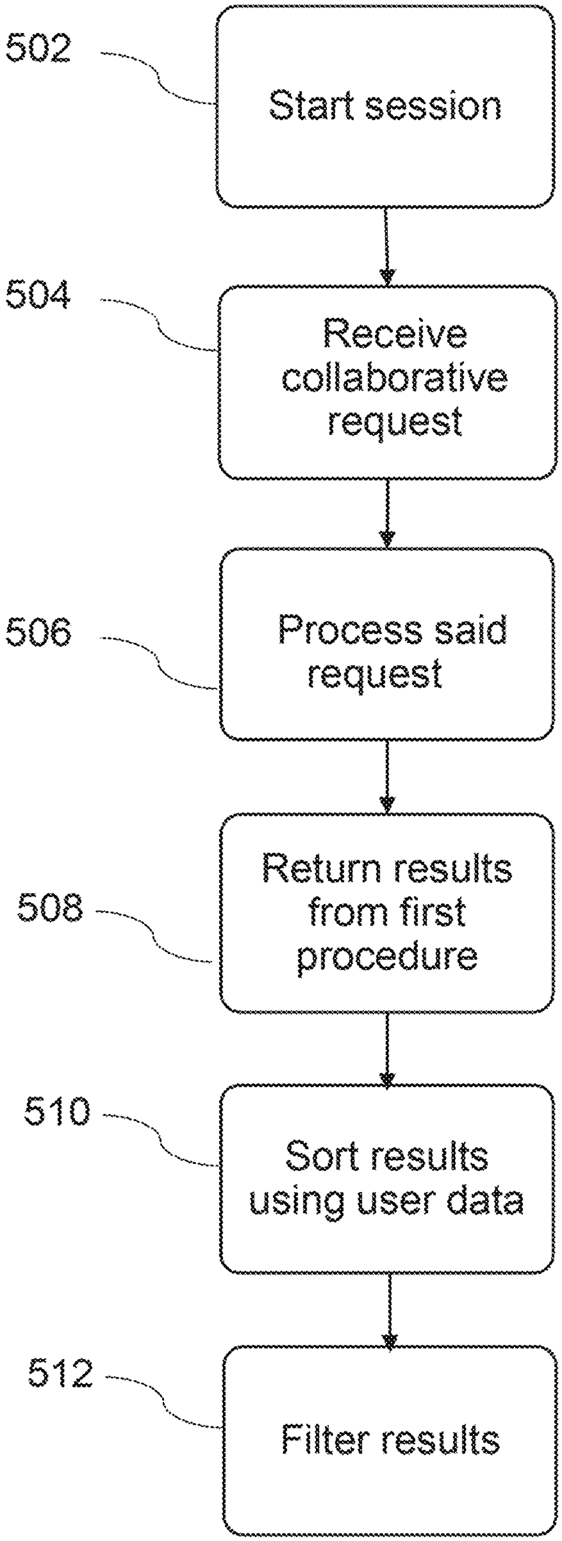
FIG. 5 is an overview of a method of generation content recommendations in accordance with a further embodiment.

FIG. 5 depicts an example of a combined process, in accordance with an embodiment. The process of FIG. 5 is a personalised sort recommendation.

At step 502, the session is started substantially as described with reference to step 402 of FIG. 4.

At step 504, a collaborative request is received. The collaborative request may be a user or item based collaborative request. In the present embodiment, the request is a user based collaborative request that receives user data as its input. The number of candidates taken from the collaborative model is configurable.

At step 506, the collaborative request procedure is performed and a set of content recommendation candidates are returned at step 508.

At step 510, the set of content recommendation candidates are provided to a second procedure. In this embodiment, the second procedure is a sort operation based on user profile features. In particular, in the present embodiment, the set of content recommendation candidates have related content information including content metadata and the user profile includes content metadata based on previous user activity. The recommendation candidates are then sorted based on a comparison of the content information of the candidates and the content metadata of the user profile. The sorting process sorts the candidates into an order based on the similarity of the content information and the content metadata.

At step 512, the set of content recommendation candidates are then filtered to return a sub set of the provided to a second procedure. While described as separate steps, steps 510 and 512 may be substantially performed by a single procedure that sorts and filters a candidate set. It will be understood that the above-described process allows further personalization of results.

As a first example, a content recommendation process referred to as "most popular movies for you" is described. The first procedure is a procedure that returns recommendation based on a global statistic derived from user engagement data for the plurality of users. In this example, the global statistic is the most watched movies. In this example, the first procedure returns a set of the 50 most watched movies. It will be understood that the number of results is controllable, for example, by passing the desired number of the procedure. The first procedure thus also include filtering/selecting functionality.

In this example, the set of fifty recommendation candidates are then provided to a second procedure corresponding to a personalised sort operation. The personalised sort operation, as described with reference to FIG. 5, is configured to use user data based on user activity and/or associated content metadata to sort a list of recommendation candidates. In this embodiment, the content recommendation candidates are returned together with a score representing their ranking in the list (in this example, between 1 and 50). The personalize sort operation sorts the content recommendation candidates based on an alternative property or score. The personalized sort outputs a subset of the first set of recommendation candidates sorted based on one or more user profile features. In the present example, ten recommendation candidates are output by the second operation.

The first example thus allows a best matched subgroup of the most popular movies to be output as a recommendation candidates by combining two known procedures.

As a second example, a personalised collaborative recommendation request is formed using two known recommendation procedures. In this example, the first procedure is a collaborative request configured to receive as an input user data or a user profile and to produce an output comprising as set of 20 content recommendation candidates. The collaborative request uses collaborative filtering to output results based on content engagement data for a plurality of users. The outputs of the collaborative request are output together with a weighting.

As described with reference to the previous example, the second type of procedure is a personalized sort procedure. The personalized sort procedure receives as an input the collaborative request input, sort the list using the user profile, and returns a desired number of results (for example, the top 10).

The personalized collaborative thus allows personalization of content recommendations that are based on user engagement for a plurality of users.

As a third example, a personalised related search is described. In this example, a related content procedure is used to generate a set of recommendations (for example, 20 recommendations) and this set is sorted using one or more metadata items of the user profile, for example, by a user preference. The sorted results may be further filtered, so that only a subset are returned in the final list. The benefit over a related content request is that the most similar content is still returned, but this is now sub-sorted by user profile features.

As a fourth example, the combining process is configured to combine the results of multiples request and then perform a further operation on the combined results. Without the additional further operation, the results would be returned based on the order the requests were received. Allowing a further operation allows the results to be combined.

In such embodiments, the scores returned from the first request may be used in the second operation for example to re-sort the results. In such an example, the scores from each request may need to be normalised.

As a fifth example, multiple parallel procedures may be performed. In one example, a first operation returns a set of content items and each of these content items is used as a seed item in a plurality of request to generate respective sets of content items. For example, a first procedure may return the five most popular content items and each item is then used as a seed item for five further procedures to generate five sets of content recommendations. In some embodiments, each sets of content recommendation is presented to the user via a distinct interactive element on the display, for example, a scrollable carousel or other selectable indication of a content selection interface. In some embodiments, a set of most recently watched content items may be selected for a set of corresponding recommendations. The interactive elements may be corresponding plurality of groups of one or more content recommendations, wherein each group is displayed via an interactive element of a content selection interface, for example, a scrollable carousel.

In some embodiments, different types of procedures may be performed in parallel and the combining process may include combining outputs from a plurality of different requests may be combined in a final set of recommendation candidates. In such embodiments, the parallel requests may be performed simultaneously. For example, the final set of recommendation candidates may include a first number from a first type of recommendation, a second number from a second type etc. The number and type may be selectable by a user. As a non-limiting example, the first results may be a first candidate from an editorial request (for example, as a results of a business or legal agreement to display such a result), the next two results may be episodes not watched in one or more series that a user is in the process of consuming, and then the next seven results may be personalized recommendations. The types of request and the number of results may be selected by a user using an interactive user interface. In some embodiments, each of the generated plurality of groups of one or more content recommendations is displayed via an interactive element of a content selection interface, for example, a scrollable carousel.

In some embodiments, only the final set of candidates resulting from the combining process are presented to the user. In some embodiments, the combining process includes a step of applying an aggregating operation that collects results from a plurality of sets of intermediate results (as generated by preceding procedures) as a set of aggregated results. The aggregated results may be presented to a user via a user interface.

In the above-described embodiments, the combining process is performed based on a set of rules or combining instructions. In further embodiments, the combining process is an interactive process allowing a developer or an end user to experiment with combining different procedures, for example, via a graphical user interface.

As described above, the generated content recommendation candidates may be displayed on a user device, for example, via one or more indications, such as images. Image data for each recommendation candidates may be retrieved for displaying on the user device. In some embodiments, the user device is configured to display a content selection interface that includes interactive and/or selectable elements for a user to select and interact with. The interactive elements can interacted with by a user, by the user providing user input (for example, via a user device) and are operable in order to retrieve and provide the selected content to the user.

In addition aspects, in some embodiments, aspects of the combining process are also controllable via an interface, for example, the same content selection interface may provide interactive elements to allow a user to select one or more aspects of the combining process, such as, the types of request, the ordering or configuration of requests and the data flow between the requests and/or any other parameters required by the requests. In some embodiments, the workflow of the combined process is graphically represented to the user, to allow a user to visualize the workflow.

The or more aspects of the combining process that are represented by the set of instructions can include, for example, data inputs and/or outputs, procedure parameters, and/or the type of procedures and/or the ordering of procedures. The workflow of the combining process may be graphically represented on the display.

It is clear from the above examples that the combining functionality allows a user to create a different number of different functions and use cases. In addition, new types of procedure may be formed while avoiding the need to provide core updates to the system.

In addition, as each procedure is taken from a library of known and therefore well tested procedures, reliability of the new procedures may be improved.

The interactive elements may comprise selectable indications. The indications may be selectable to selectively download, stream and/or playback the selected content, which may be on a user device, such as a user device on which the content selection interface is provided.

Although a particular system arrangement is shown in FIG. 1, there are various system arrangements that could be used. For example, FIG. 6 shows a "middleware" arrangement in which the recommendation system 2 sits as "middleware" between the users 205 and systems of a content provider 210. The recommendation system 2 is implemented by processing resource 220 (which may comprise one or more processors) with the storage device 4 and user cache 6. In some examples, the recommendation system 2 can be implemented by a cloud computing system, by one or more servers or other suitable enterprise level computing system. In this arrangement, systems that implement the recommendation system 2 receive data sent from the user devices 40 of the users 205 that represents the user actions/user activity taken by the user 205 that are relevant to the content selection interface, such as but not limited to actions taken by the user 205 during operation of the content selection interface, including one or more of the user actions listed above. The user devices 40 also provide a user ID that can be used to identify the user 205 to allow the provision of a content selection interface that is customized for that user 205. The user devices 40 communicate the data over a network, such as the cloud 215, to the recommendation system 2. The recommendation system 2 records the user actions in order to generate learn actions and build and update a user profile that can be used to configure and customize a content selection interface for the user 205. The recommendation system 2 can communicate the requests and other data from the user devices 40 to the content providers systems 210 in order to provide the content to the user devices 40.

Figure 7:
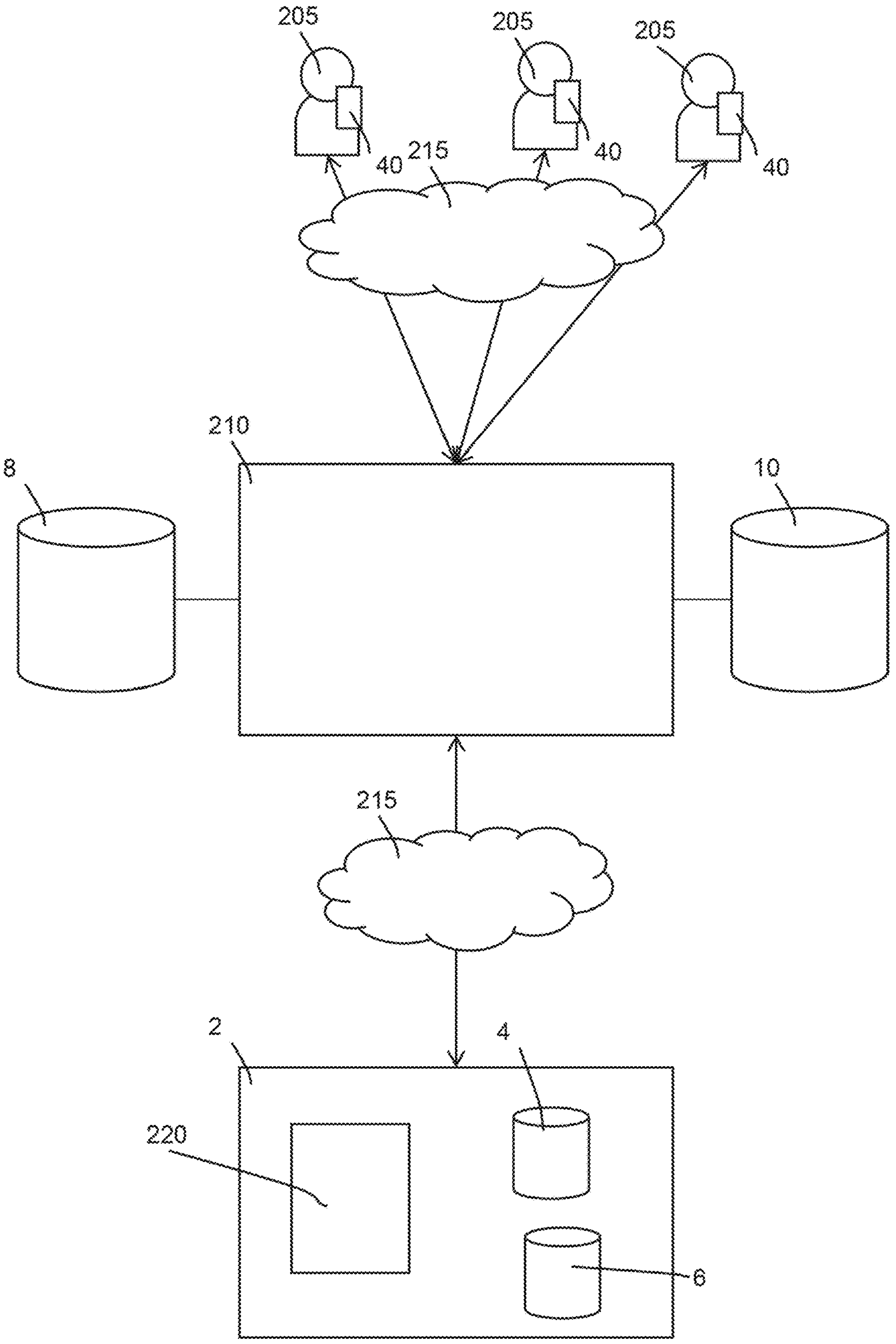
FIG. 7 is a schematic of an alternative system arrangement to that of FIG. 6.

Other system arrangements that provide similar functionality to customize the content selection interfaces for users are possible. FIG. 7 shows an alternative system configuration in a "backend" processing arrangement. In this arrangement, the user devices 40 interface directly with the systems of a content provider 210, which implements the content selection interface and handles the requests from the user devices 40. User interaction data from the user devices 40 is provided by the systems of a content provider 210 to the recommendation system 2 in order for the recommendation system 2 to identify learn actions and build user profiles for at least partly customizing the content selection interface for that user. The recommendation system 2 provides the data for customizing the content selection interface for that user, including an ordering with which to present at least some of the groups of content in the user selection interface, to the systems of a content provider 210 for providing in the content selection interface for that user 205.

Content items, for example programmes, that are scheduled in an electronic programme guide have associated content information (metadata). Information about content available from this source is stored in the EPG content source table. In a similar fashion to EPG content items, information for video on demand (VOD) content items are stored on the VOD module 10. EPG content items and VOD content items sharing certain characteristics can be arranged into groups. In addition to above, content items are stored on PVRs and have associated information. A group of EPG content items may be considered as equivalent to a broadcast television channel. VOD content items can be grouped into logical groups, for example, movie categories. VOD content item groups can be used to enable or restrict access to content items on a per customer basis. PVR content information is collected and stored in the PVR table 32.

For each content item group, either EPG or VOD, the information that is stored may include: an identifier for the group; a name for the group; a flag indicating if the group is free to view and therefore available to all customers; an indicator of video format of the group e.g. unknown, standard definition, high definition and 3D; one or more language labels; primary and secondary geographic area information. Concerning VOD content item groups, the primary and secondary geographic information can be used to allow customers from different countries access to different content. If the group is associated with a channel then an identifier and mapping to the channel may also be stored. One or more content item groups can be associated with a channel number.

Single content items (e.g. programmes) also have associated information and characteristics. Stored content item information can be constant or variable. Constant content item information has values that are the same for all instances of the content item. Variable content item information has values that vary between different instances of the content item. For example, the same episode may be shown at two different times. The two instances of the same episode share constant characteristics, such as duration and rating but different schedule times, for example.

Constant content item information includes: a unique identifier; duration of the content item; the certificate of the content item e.g. the age rating; the year the content item was released; the critic rating for the content item; the original audio language for the content item; the season and episode numbers; series title information and/or identifier; content item description, and a primary language to be used by the recommendations engine 22 when checking for previously recommended items. The primary language may or may not be the same as the original audio language. For multi-language content items, translations of the title and description can be stored. Furthermore, available broadcast language information can be stored and an indicator to indicate the type of language available. For example, the language may be primary audio language, dubbed audio, subtitled and/or signed.

Further information stored for content items includes: genre and sub-genre information and names associated with the content item. A given name can be associated with, for example, an actor or director involved with or appearing in the content item. For a given name associated with the content item, an identifier for the role in the content item is also stored. In addition, an indicator of the rank of importance of the name and/or the role in the content item may be stored. The rank may be high for a more important role in the content item. For example, a given actor playing a leading part would be assigned the highest rank available.

In the embodiment of FIG. 1 recommendations of items of content may be provided based on data concerning items of content of the same type (for example video content, such as movies, TV programmes or other video content), and/or based on user data representing previous consumption of, or actions relating to, content of the same type (for example video content, such as movies, TV programmes or other video content). It will be understood that video content may include associated audio content, for example an associated soundtrack.

In alternative embodiments, recommendations are generated by the CRE 22 for content items of one type based on content information or user actions concerning content of another type. The different types of content may comprise, but are not limited, to video content (for example, movies, TV programmes or other video content), audio content (for example, music, podcasts, talking books), computer games, books, magazines, other printed content, live performances such as concerts, plays, comedy performances or sporting events.

For example, if user data stored for a user, for example in the hard disk 4, indicates that a user has bought tickets or attended a live performance, for example of a musical act or sports team, then the CRE 22 may use that user data in the content recommendation process, which may increases the likelihood that the CRE 22 will recommend a movie or TV programme or other content concerning that musical act or sports team.

Similarly, if user data stored for a user, for example in the hard disk 4, indicates that the user has read or purchased a particular book then the CRE 22 may use that user data in the content recommendation process, which may increases the likelihood that the CRE 22 will recommend a movie or TV adaptation of that book or of other books by the same or similar authors or relating to the same or similar genres (for example, action, crime, romance, etc.).

In some embodiments, the content recommendation based on user actions or preferences concerning content of one type may comprises recommendations of more than one type of content. For example, a content recommendation may be based on user actions or preferences in relation to TV programmes, but the content recommendation may comprise recommendations of one or more TV programmes and, in addition, one or more items of another type of content.

Although the system of the embodiment of FIG. 1 includes hard disk storage 4 and RAM 7, any suitable other memory devices or types of storage may be used as well as or instead of the hard disk storage 4 and/or RAM 7 in alternative embodiments.

The above description of specific embodiments is made by way of example only. A skilled person will appreciate that variations of the described embodiments may be made without departing from the scope of the invention.

What is claimed is:

1. A computer-implemented method for providing content recommendations for a user of a content distribution system, the method comprising:

opening a content recommendation session for a selected user, wherein a plurality of data processing procedures, or operations, are available for use during the content recommendation session, wherein the plurality of data processing procedures are stored in a procedure library, the plurality of data processing procedures comprising at least one type of content recommendation procedure for generating one or more content recommendation candidates based on user data and/or content metadata and/or other content information;

wherein the method further comprises performing a combining process using one or more of the plurality of data processing procedures from the procedure library to generate one or more content recommendation candidates, wherein the combining process comprises at least:

receiving at least one content recommendation request for the selected user from a user device;

processing said at least one request using at least a first procedure selected from the plurality of procedures to generate a plurality of content recommendation candidates;

providing at least some of the generated plurality of content recommendation candidates from the at least first procedure to at least a second procedure selected from the plurality of procedures to generate a plurality of personalized content recommendation candidates, wherein the second procedure comprises performing a sorting, ranking and/or a filtering procedure based on at least user data for the selected user representative of user activity and/or content metadata associated with said user activity to generate the personalized content recommendation candidates, wherein the sorting, ranking and/or a filtering procedure comprises performing a matching process on at least some of the generated plurality of content recommendation candidates, the matching process comprising comparing metadata associated with the at least some plurality of content item recommendations with metadata associated with or represented by the user data to order the at least some content recommendation candidates from closest match to least closest match, wherein the ordered content recommendation candidates form at least part of the personalized content recommendation candidates.

2. The method of claim 1, wherein the plurality of procedures comprise at least one procedure to generate content recommendation candidates based on a received content item or content item identifier and/or at least one property of a content item.

3. The method of claim 1, wherein the plurality of content recommendation procedures comprise a first type of procedure configured to generate a set of candidates associated with a first score or other metric and a second type of procedure configured to return a set of candidates associated with a second, different score or metric.

4. The method of claim 3 wherein at least one of the first score and the second score is determined based on user data.

5. The method of claim 1, wherein at least one of the procedures is dependent on user data stored in a user profile, and wherein the user profile represents or is indicative of one or more properties or parameters of content metadata based on user activity and wherein at least one of the procedures comprises a selecting, ranking and/or filtering based on said at least one or more properties.

6. The method of claim 1 wherein the combining process comprises providing data representative of the results from at least one instance of a first procedure to multiple instances of a second procedure to generate respective multiple sets of content recommendation candidates.

7. The method of claim 1, wherein the combining process comprises performing at least two recommendation procedures and displaying the generated candidates as interactive elements of a content selection interface wherein the interactive elements are operable in order to provide the selected content.

8. The method of claim 1, wherein the combining process comprising performing a plurality of requests corresponding to one or more types of procedure to generate a corresponding plurality of groups of one or more content recommendations, wherein each group is displayed via an interactive element of a content selection interface.

9. The method of claim 1, wherein the combining process is based on a pre-determined set of instructions representing the types and/or order and/or data flow of the combining process.

10. The method of claim 1, wherein indications of the content recommendation candidates associated with the combining process are displayed on a content selection interface on user device, and wherein one or more aspects of the combining process is based on, and/or modified in response to, received user input received via the user device, wherein the displayed candidates or indications of candidates are updated in response to receiving user input.

11. The method of claim 1, wherein the combining process is graphically represented on a graphical user interface by one or more graphical elements and wherein one or more aspects of the combining process is selectable and/or modifiable by interaction with one or more interactive elements.

12. The method of claim 1, wherein the combining process comprising performing a plurality of requests corresponding to one or more types of procedure to generate a corresponding plurality of groups of one or more content recommendations, wherein each group is displayed via an interactive element of a content selection interface.

13. The method of claim 12, wherein a content selection interface comprises a scrollable carousel.

14. The method of claim 1 wherein the plurality of content recommendation procedures comprise at least one of a), b), c), d), e):

a) a related content procedure configured to: receive a seed content item identifier identifying a seed content item and obtain metadata associated with the seed content item identified by the seed content item identifier and identify related content comprising content associated with one or more of the same or similar metadata;

b) a procedure dependent on at least a statistic determined using content engagement for a plurality of users, optionally wherein the statistic relates to user engagement and/or user ratings, optionally, wherein the statistic comprises the most popular and/or highest rated over a time period;

c) a procedure based on at least content engagement for a plurality of users, for example, content-item interaction data;

d) a collaborative procedure configured to receive a seed content item identifier or user identifier and identify collaborative content comprising content viewed by said other users who have viewed said seed content item;

e) an aggregating procedure configured to aggregate content recommendation candidates from a plurality of requests.

15. The method of claim 1, wherein at least one of the plurality of procedures is controllable to select the number of generated recommended content candidates.

16. The method of claim 1, wherein the combing process comprise: performing a plurality of recommendation procedures to generate a respective plurality of sets of content recommendation candidates and combining said plurality of sets and performing a further procedure from the plurality of procedures on the combined set of recommendation candidates.

17. The method of claim 1, wherein each set of content recommendation candidates is provided together with a first score or metric and wherein the combining process comprises performing a normalisation process using the first score prior to performing a second procedure on the combined set of recommendation candidates.

18. A non-transitory computer-readable medium that comprises computer-readable instructions that are executable to perform the method of claim 1.

19. A system comprising processing circuitry configured to open a content recommendation session for a selected user, wherein a plurality of data processing procedures, or operations, stored in a procedure library are available for use during the content recommendation session, the plurality of data processing procedures comprising at least one type of content recommendation procedure for generating one or more content recommendation candidates based on user data and/or content information;

wherein the processing circuitry is further configured to:

perform a combining process using one or more of the plurality of data processing procedures from the procedure library to generate one or more content recommendation candidates, wherein the combining process comprises at least:

receiving at least one content recommendation request for the selected user from a user device;

processing said at least one request using at least a first procedure selected from the plurality of procedures to generate a plurality of content recommendation candidates;

providing at least some of the generated plurality of content recommendation candidates from the at least first procedure to at least a second procedure selected from the plurality of procedures to generate a plurality of personalized content recommendation candidates, wherein the second procedure comprises performing a sorting, ranking and/or a filtering procedure based on at least user data for the selected user representative of user activity and/or content metadata associated with said user activity to generate the personalized content recommendation candidates, wherein the sorting, ranking and/or a filtering procedure comprises performing a matching process on at least some of the generated plurality of content recommendation candidates, the matching process comprising comparing metadata associated with the at least some plurality of content item recommendations with metadata associated with or represented by the user data to order the at least some content recommendation candidates from closest match to least closest match, wherein the ordered content recommendation candidates form at least part of the personalized content recommendation candidates.

* * * * *